United States Patent
Juliato et al.

(10) Patent No.: US 11,038,909 B2
(45) Date of Patent: Jun. 15, 2021

(54) METHODS AND APPARATUS FOR ANOMALY DETECTION AND RECOVERY

(71) Applicant: Intel Corporation, Santa Clara, CA (US)

(72) Inventors: Marcio Juliato, Portland, OR (US); Liuyang Lily Yang, Portland, OR (US); Manoj Sastry, Portland, OR (US); Christopher Gutierrez, Hillsboro, OR (US); Shabbir Ahmed, Beaverton, OR (US); Vuk Lesi, Durham, NC (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/235,812

(22) Filed: Dec. 28, 2018

(65) Prior Publication Data
US 2019/0158521 A1    May 23, 2019

(51) Int. Cl.
| | | |
|---|---|---|
| *B60R 16/02* | (2006.01) | |
| *H04W 4/48* | (2018.01) | |
| *H04W 12/122* | (2021.01) | |
| *H04L 29/06* | (2006.01) | |
| *B60R 16/023* | (2006.01) | |
| *H04L 29/08* | (2006.01) | |

(52) U.S. Cl.
CPC ...... *H04L 63/1425* (2013.01); *B60R 16/0232* (2013.01); *H04L 63/1408* (2013.01); *H04L 63/1416* (2013.01); *H04L 63/1441* (2013.01); *H04L 63/1466* (2013.01); *H04L 67/125* (2013.01); *H04W 4/48* (2018.02); *H04W 12/122* (2021.01)

(58) Field of Classification Search
CPC ............ B60R 16/0232; H04L 63/1408; H04L 63/1416; H04L 63/1425; H04L 63/1441; H04L 63/1466; H04L 67/125; H04W 12/1204; H04W 4/48
See application file for complete search history.

(56) References Cited

U.S. PATENT DOCUMENTS

| | | | | |
|---|---|---|---|---|
| 10,235,523 | B1 * | 3/2019 | Keller, III | G06F 21/556 |
| 2008/0292146 | A1 * | 11/2008 | Breed | B60N 2/002 |
| | | | | 382/118 |
| 2012/0223403 | A1 * | 9/2012 | Keller, III | H01L 23/576 |
| | | | | 257/428 |

(Continued)

OTHER PUBLICATIONS

Hall et al., "Escape Can Limitations," Apr. 2007, 10 pages.

*Primary Examiner* — Tyler J Lee
(74) *Attorney, Agent, or Firm* — Hanley, Flight & Zimmerman, LLC

(57) ABSTRACT

Methods, apparatus, systems and articles of manufacture are disclosed for anomaly detection and recovery. An apparatus to isolate a first controller in an autonomous vehicle includes a first controller to control a reference signal of the autonomous vehicle via a communication bus, a second controller to control the reference signal of the autonomous vehicle when the first controller is compromised, and a message neutralizer to neutralize messages transmitted by the first controller when the first controller is compromised, the neutralized messages to cause the first controller to become isolated from the communication bus.

28 Claims, 14 Drawing Sheets

(56) References Cited

U.S. PATENT DOCUMENTS

| | | | |
|---|---|---|---|
| 2013/0314258 A1* | 11/2013 | Lyons | G01C 23/00 340/974 |
| 2018/0370540 A1* | 12/2018 | Yousuf | B60W 50/023 |
| 2019/0042738 A1 | 2/2019 | Juliato et al. | |
| 2019/0052654 A1 | 2/2019 | Juliato et al. | |
| 2019/0077272 A1* | 3/2019 | Newman | H02J 7/0063 |

* cited by examiner

| FIELD | LEN. [BIT] |
|---|---|
| SFD | 1 |
| MID | 11+1 |
| CTR | 2+4 |
| AAP_REACT | 6 |
| ACT_ERR_FLAG | 6 |
| PAS_ERR_FLAG | 6 |
| ERR_IFS | 11 |
| CRC,EOF | 15+1+2+7 |
| IFS | 3 |

Table: Message fields and their respective bit lengths

FIG. 9

METHODS AND APPARATUS FOR ANOMALY DETECTION AND RECOVERY

FIELD OF THE DISCLOSURE

This disclosure relates generally to anomaly detection, and, more particularly, to methods and apparatus for anomaly detection and recovery.

BACKGROUND

In recent years, autonomous vehicles have developed to communicate information among different operating systems within a vehicle with minimal interaction from an individual. As such, the autonomous vehicles rely primarily on network communications between the different operating systems to efficiently and safely operate on the road, in some examples, without a driver.

BRIEF DESCRIPTION OF THE DRAWINGS

FIG. 9 is an example message structure defining message fields of a message and their respective bit lengths.

The figures are not to scale. In general, the same reference numbers will be used throughout the drawing(s) and accompanying written description to refer to the same or like parts.

DETAILED DESCRIPTION

Figure 1:
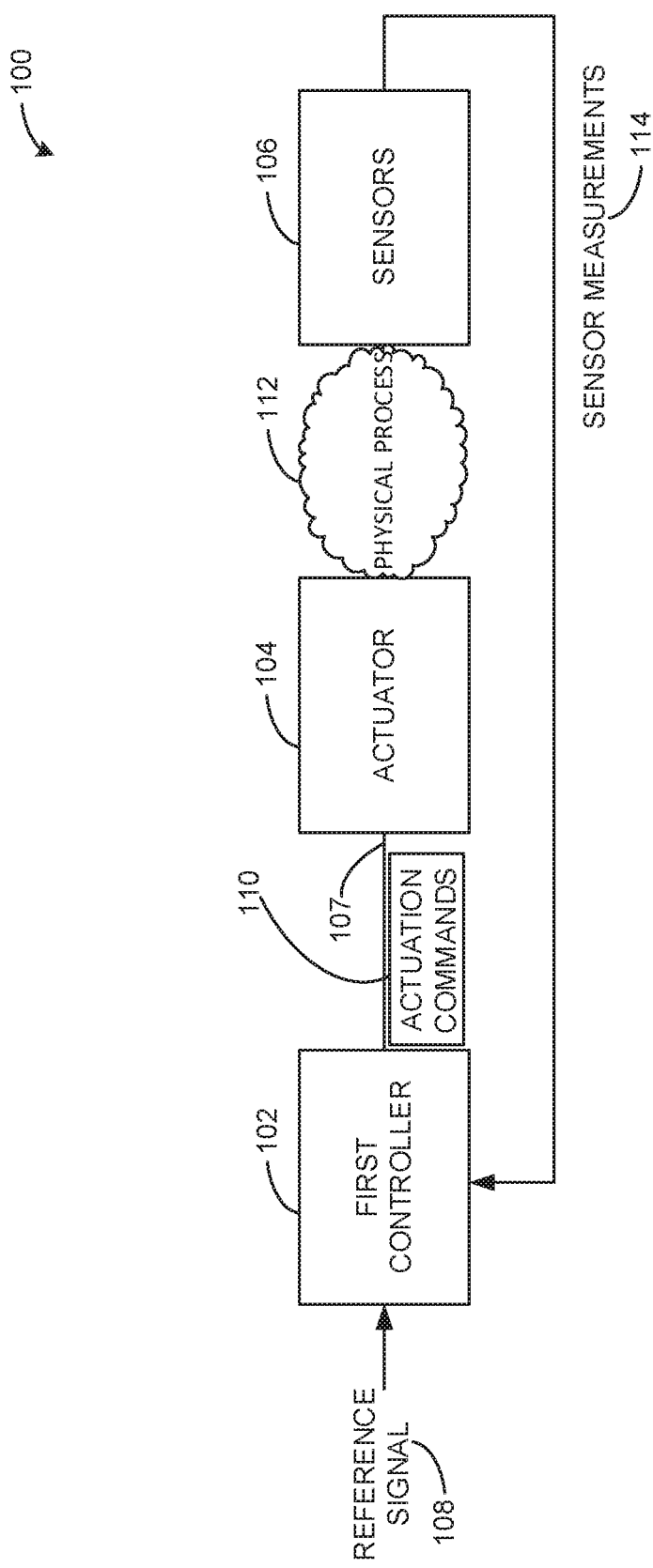
FIG. 1 is a block diagram of an example closed-loop apparatus constructed operate a vehicle in accordance with teachings of this disclosure.

Automated driving systems rely on correct and robust operation of underlying closed-loop controls. An anomaly (e.g., due to adversarial actions, a malicious attack, a hardware failure, a software failure, etc.) can target critical control systems of the vehicle, therefore compromising the vehicle's safety. For example, an attacker who has compromised lateral/longitudinal control of an electronic control unit (ECU) can accelerate, brake, and steer the vehicle. Some automotive systems include a variety of electronic control with mechanical fallback for increased reliability. However, autonomous vehicles rely primarily on electronic systems for control. In some levels of automation there is no physical interfaces exposed to the driver/operator. As such, during an attack on an ECU, the driver/operator is unable to take any corrective actions. Prior fault-tolerant and control techniques are based on known fault-models and rely on strict conditions for control switch. Even though these approaches work well under fault models, these prior approaches do not cover adversary models where malicious actions are unpredictable. Moreover, once an attacker has gained software execution on control ECUs, these prior approaches have no effective way to contain and/or mitigate the attacker's malicious actions. For autonomous vehicles to remain safe for operation, the autonomous vehicles must maintain safe operation of control systems under adversarial influences, which requires the introduction of security mechanisms to detect and recover the system from attacks in real time.

Existing redundancy-based techniques rely on rich fault modeling, including specification of plausible failure modes. Depending on the control system, transition from one controller to a spare one is performed manually, under controlled conditions (e.g. through plant shutdown, reduced functionality, and/or under known safe states). Prior automotive systems using drive-by-wire rely on mechanical counterparts as a fallback plan in case of faults, in which the driver can manually take over the failed functionality and thus maintain the control of the vehicle. However, these prior techniques are unable to survive malicious actions of attackers residing inside compromised ECUs. That is, the aforementioned prior techniques rely on prior fault models and prior control switch transitions. As such, adversarial effects that are generally unpredictable, cannot be efficiently defended against under these traditional frameworks. Furthermore, these prior techniques, as part of a take-over procedure, do not address the problem of disconnecting compromised nodes from the network by an online monitoring agent. Moreover, these prior techniques rely on architectural design support, e.g., access to internal signals of the original controller, which makes it infeasible to address the security challenges faced by many legacy systems already designed by automobile original equipment manufacturers (OEM) and their supply network.

Examples disclosed herein are directed to autonomous recovery techniques for online isolation and replacement of compromised controller ECUs. Examples disclosed herein are based on the following principle of operation: If a controller is compromised, that controller should be immediately disconnected from a communication bus and the recovery controller must be engaged within a control period. In contrast from prior systems, examples disclosed herein operate without plant shut down or human intervention. Examples disclosed herein utilize a network-based intrusion detection system (IDS) (e.g., intrusion detector) (to immediately trigger the intrusion), an Active Attack Isolation module (e.g., a message neutralizer) (to switch the role of the original controller from authentic to malicious), and a spare controller (that keeps its state close to the original one and is therefore able to immediately take over control functionality).

Examples disclosed herein ensure system safety under adversarial influence by maintaining full closed-loop control functionality through real-time controller take-over. Examples disclosed herein can be used as a wraparound to protect an existing (unsecure) controller with the addition of a control-loop IDS (e.g., an intrusion detector), Active Attack Isolation module (e.g., message neutralizer), and a hot spare recovery controller on the network, as examples disclosed herein do not impose any architectural dependence on the originally deployed (unsecure) controller. Examples disclosed herein provide safety and security for autonomous vehicles. Thus, enabling an autonomous system to survive cyberattacks and continue to be safe and operational offers a crucial differentiation value to other automotive systems. Examples disclosed herein are directed to recovery of ECUs within safe time boundaries, and vehicle safety at, and beyond, the point of switching through maintenance of tight system state estimations and soft transition between the recovery and the original controllers without noticeable disturbances in the physical behavior of the system.

FIG. 1 illustrates an example closed-loop apparatus 100 which may be implemented in an autonomous vehicle to control the autonomous vehicle without user interaction. Closed-loop control systems are systems that utilize immediate or estimated measurements of variables of interest to adjust actuation inputs, to maintain the controlled variables at desired reference set-points. For example, a vehicle's cruise controller takes a set-point cruise speed and various measurements indicative of vehicle speed, to control engine inputs to maintain the vehicle set-point speed. This process is periodically repeated (e.g., every 10 ms for cruise control) to ensure real-time control of the variables of interest.

Design of the closed-loop controller requires knowledge of the controlled physical process. This knowledge is condensed into mathematical models that are used to fine-tune the control algorithm in order to achieve targeted closed-loop performance metrics. The models of the controlled process and the control algorithm can be utilized with state estimation to monitor correct behavior of the controlled physical process and the closed-loop controller by a network-based monitoring module that is architecturally independent of the closed-loop controller. Discrepancies between predicted and observed behaviors of the process and controller produce residual signals for sensor and controller outputs. The Residual signals can be utilized to detect and localize intrusions on components in the monitored system. The illustrated example of FIG. 1 depicts a logical configuration of the closed-loop control system that is capable of keeping a precise state estimate solely from the readings acquired from a communication bus (e.g., a communication bus between a controller and an actuator).

In the illustrated example of FIG. 1, the closed-loop apparatus 100 includes a first controller 102, an actuator 104, and sensors 106. In some examples, the first controller 102 is a means for controlling, or a controlling means. In some examples, the actuator 104 is a means for actuating, or an actuating means. In some examples, the sensors 106 are a means for sensing, or a sensing means. In some examples, the closed-loop apparatus 100 includes a communication bus 107 which controls reference signals and/or variables (e.g., speed) of a vehicle. During operation, the first controller 102 receives a reference signal 108 which indicates an operation to be performed by a vehicle. For example, the first controller 102 may receive a reference signal 108 including a command to enter cruise control mode. As such, the first controller 102 of the illustrated example transmits actuation commands 110 via the communication bus 107 to control operation of the actuator(s) 104. For example, the actuation commands 110 may include commands to increase and/or decrease operation of components of the vehicle to increase a vehicle speed. The actuator 104 receives the actuation commands 110 and performs the physical process 112. The physical process 112 of the illustrated example may include increasing a vehicle speed, decreasing a vehicle speed, stopping the vehicle, etc. The physical process 112 may be to modify any operation of a machine or a vehicle that includes examples disclosed herein. While the physical process 112 is being performed, the sensors 106 obtain sensor measurements 114 of the components of the vehicle. For example, the sensors 106 may monitor a vehicle wheel speed, an engine power output, braking pressure, etc. The sensors 106 of the illustrated example transmit the sensor measurements 114 to the first controller 102. The first controller 102 analyzes the sensor measurements 114 to maintain the vehicle in a controlled state (e.g., the sensor measurements 114 are within a threshold for the current operating conditions). In some examples, the first controller 102 adjusts the actuation commands 110 based on the sensor measurements 114. This process may continue until the first controller 102 receives another reference signal 108, for example.

Figure 2:
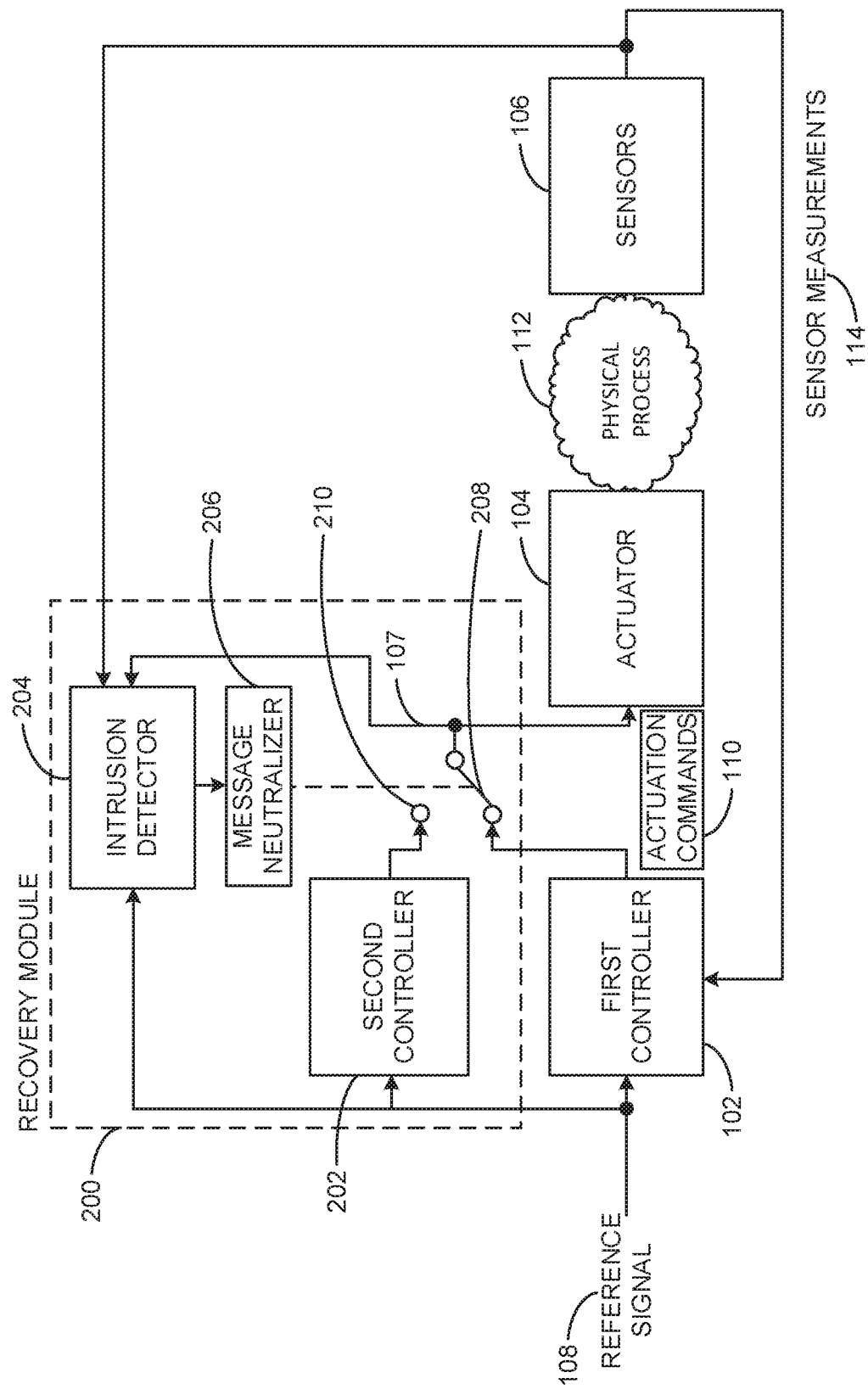
FIG. 2 is a block diagram of the example closed-loop apparatus of FIG. 1, and an example recovery module constructed in accordance with teachings of this disclosure to recover operation of the vehicle during a malicious attack.

The closed-loop apparatus 100 of FIG. 1 is susceptible to malicious attacks, which may cause a vehicle to operate in a dangerous manner. To substantially reduce or eliminate these vulnerabilities, the example closed-loop apparatus 100 of FIG. 1 is shown in FIG. 2 as implemented with an example recovery module 200 constructed in accordance with teachings of this disclosure. The recovery module 200 of the illustrated example implements a technique for safe replacement of compromised controllers with hot-spares upon intrusion detection, while maintaining continuous control of the physical process 112. In some examples, "hot-spare" is used to refer to a controller's ability to replace a compromised controller without shutting the vehicle down. For example, the recovery controller is active and can take over operation of the vehicle while the vehicle is still in operation.

In the illustrated example of FIG. 2, the recovery module 200 includes a second controller 202, an intrusion detector 204, and a message neutralizer 206. In some examples, the second controller 202 is a means for controlling, or a controlling means. In some examples, the intrusion detector 204 is a means for detecting an intrusion, or an intrusion detecting means. In some examples, the message neutralizer 206 is a means for neutralizing a message, or a message neutralizing means. The example recovery module 200 is utilized to mitigate a malicious attack without other architectural support in the first controller 102. In the illustrated example of FIG. 2, the recovery module 200 includes the message neutralizer 206 to mitigate masquerading attacks (e.g., when a compromised ECU transmits messages on behalf of other ECUs in the system). The message neutralizer 206 selectively neutralizes specific transmissions based on the message identifier field (e.g., message ID or MID), effectively increasing the transmission error counter internal to the targeted transmitter ECU. After the counter exceeds the threshold specified by the CAN standard, the targeted ECU enters bus-off state. In addition, the message neutralizer 206 is utilized to mitigate internal attacks on the controller ECU when a message modification attack is occurring. In this example, the controller ECU is not masquerading another controller (e.g., transmitting malicious commands identified as coming from a first controller that are actually being transmitted by a second controller), rather the controller ECU (e.g., first controller 102) is transmitting modified (e.g., malicious) commands using the messages that it authentically owns (e.g., transmitted directly from the first controller 102).

In the illustrated example of FIG. 2, the message neutralizer 206 operates in one of two operation modes: 1) Stand-by and 2) Knock-off. In Stand-by mode, the message neutralizer 206 does not actively do anything and remains dormant on the communication bus. In Knock-off mode (e.g., an auto-neutralize mode), the message neutralizer 206 actively neutralizes selected messages transmitted by the compromised controller (e.g., the first controller 102 and forces the first controller 102 to enter bus-off state (e.g., isolated or disconnected from the communication bus 107) and neutralize the first controller's 102 influence on the network (e.g., the network 300 of FIG. 3). As used herein, "neutralize" or "neutralizing a message" refers to modifying (e.g., corrupting) a message to be different than expected.

Figure 5:
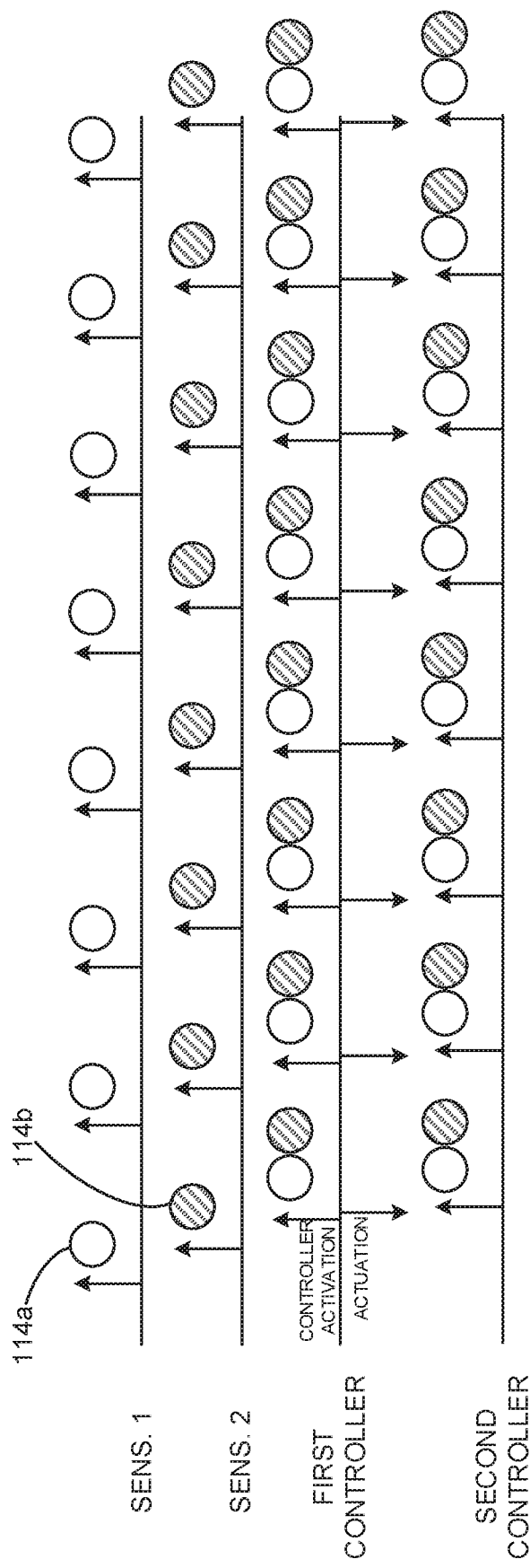
FIG. 5 is an example of a first stage of activities associated with the first controller and the second controller of FIGS. 1 and 2.
Figure 6:
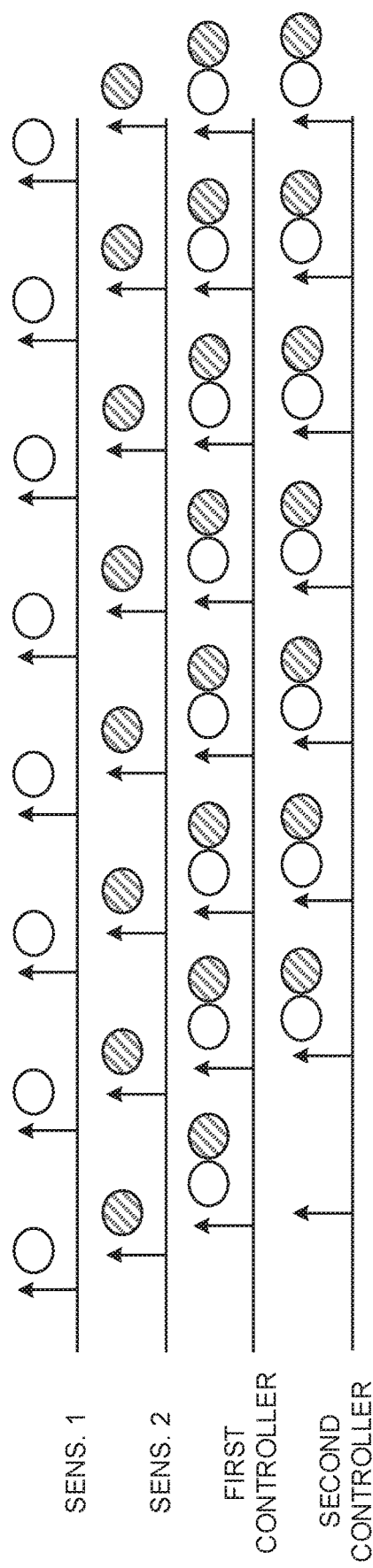
FIG. 6 is an example of a second stage of activities associated with the first controller and the second controller of FIGS. 1 and 2.

In operation, the first controller 102 receives the reference signal 108 which indicates an operation to be performed by a vehicle. Additionally, the intrusion detector 204, and the second controller 202 receives the reference signal 108. The second controller 202 receives the reference signal 108 to mirror the first controller 102. In some examples, the second controller 202 mirrors the first controller 102 synchronously, as illustrated in FIG. 5, or asynchronously, as illustrated in FIG. 6. The second controller 202 mirrors the first controller 102 to ensure an efficient and safe transition when the first controller 102 has been compromised. In a first state, in which the first controller 102 is not compromised, the first controller 102 transmits the actuation commands 110 to direct operation of the actuator(s) 104. Additionally, the actuation commands 110 are also obtained by the intrusion detector 204. In a similar manner as described in FIG. 1, the actuator 104 receives the actuation commands 110 and performs the physical process 112, and the sensors 106 obtain sensor measurements 114 of the components of the vehicle. However, in contrast to FIG. 1, the sensor measurements 114 are transmitted to the first controller 102 and the intrusion detector 204.

The intrusion detector 204 of the illustrated example obtains the reference signal 108, the actuation commands 110, and the sensor measurements 114 to determine when the first controller 102 has been compromised. For example, the intrusion detector 204 may obtain the reference signal 108 and compare the actuation commands 110 transmitted by the first controller 102 to threshold actuation commands based on the reference signal 108. For example, the intrusion detector 204 may receive the reference signal 108 and anticipate an actuation command 110 for the engine. However, the first controller 102 may transmit an actuation command 110 for the brakes, which may prompt the intrusion detector 204 to signal the message neutralizer 206 that the first controller 102 has been compromised. In another example, the intrusion detector 204 may receive the sensor measurements 114 which indicate that the wheel speed has exceeded a safe threshold. As such, the intrusion detector 204 may transmit a signal to the message neutralizer 206 indicating that the first controller 102 has been compromised. In this example, if the recovery module 200 was not present, the compromised first controller 102 would ignore the sensor measurements 114 indicating that the wheel speed has exceeded a safe threshold. As such, the first controller 102 would continue to send action commands 110 to the actuator 104 to increase the speed of the vehicle, ultimately resulting in loss of control and/or crashing of the vehicle.

Once the intrusion detector 204 has determined that the first controller 102 has been compromised, the message neutralizer 206 neutralizes the messages (e.g., the actuation commands 110) via a switch 208, as detailed below in connection with FIG. 4, forcing the first controller 102 into bus-off state. As such, the message neutralizer 206 operates the switch 208 from the first controller 102 to an input 210 of the second controller 202. In some examples, the second controller 202 is to take control of the speed of the autonomous vehicle before the first controller 102 is disengaged from the communication bus 107. Thus, the second controller 202 safely and efficiently operates the vehicle, and the compromised first controller 102 is isolated from operating any component of the vehicle.

Figure 3:
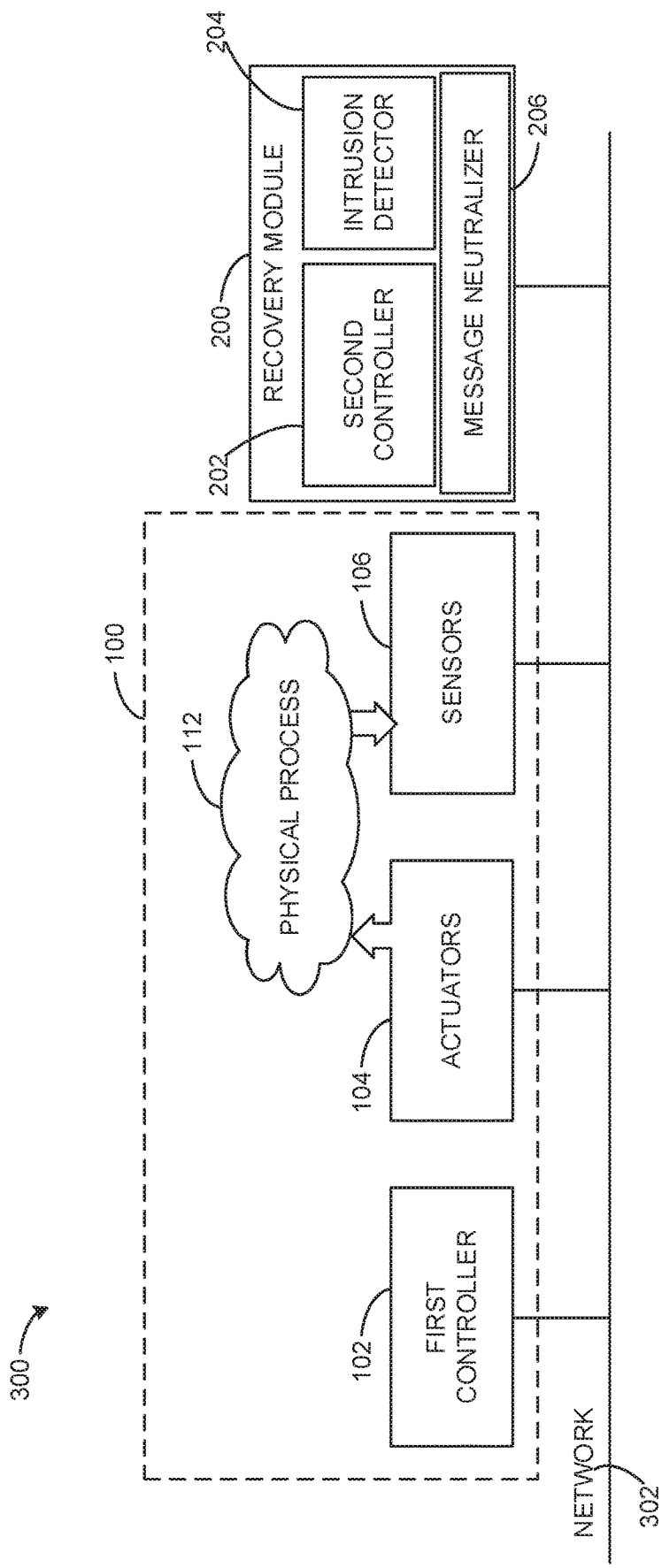
FIG. 3 is a block diagram of an example network configuration of the example closed-loop apparatus of FIGS. 1 and 2, and the example recovery module of FIG. 2 constructed in accordance with teachings of this disclosure to recover operation of the vehicle during a malicious attack.

The illustrated example of FIG. 3 illustrates a network configuration 300 of the example closed-loop architecture 100 and the recovery module 200 of FIG. 2. In the illustrated example of FIG. 3 the closed-loop apparatus 100 is in communication with the recovery module 200 via a network 302. The network configuration 300 operates in a similar manner as described above in connection with FIG. 2.

Figure 4:
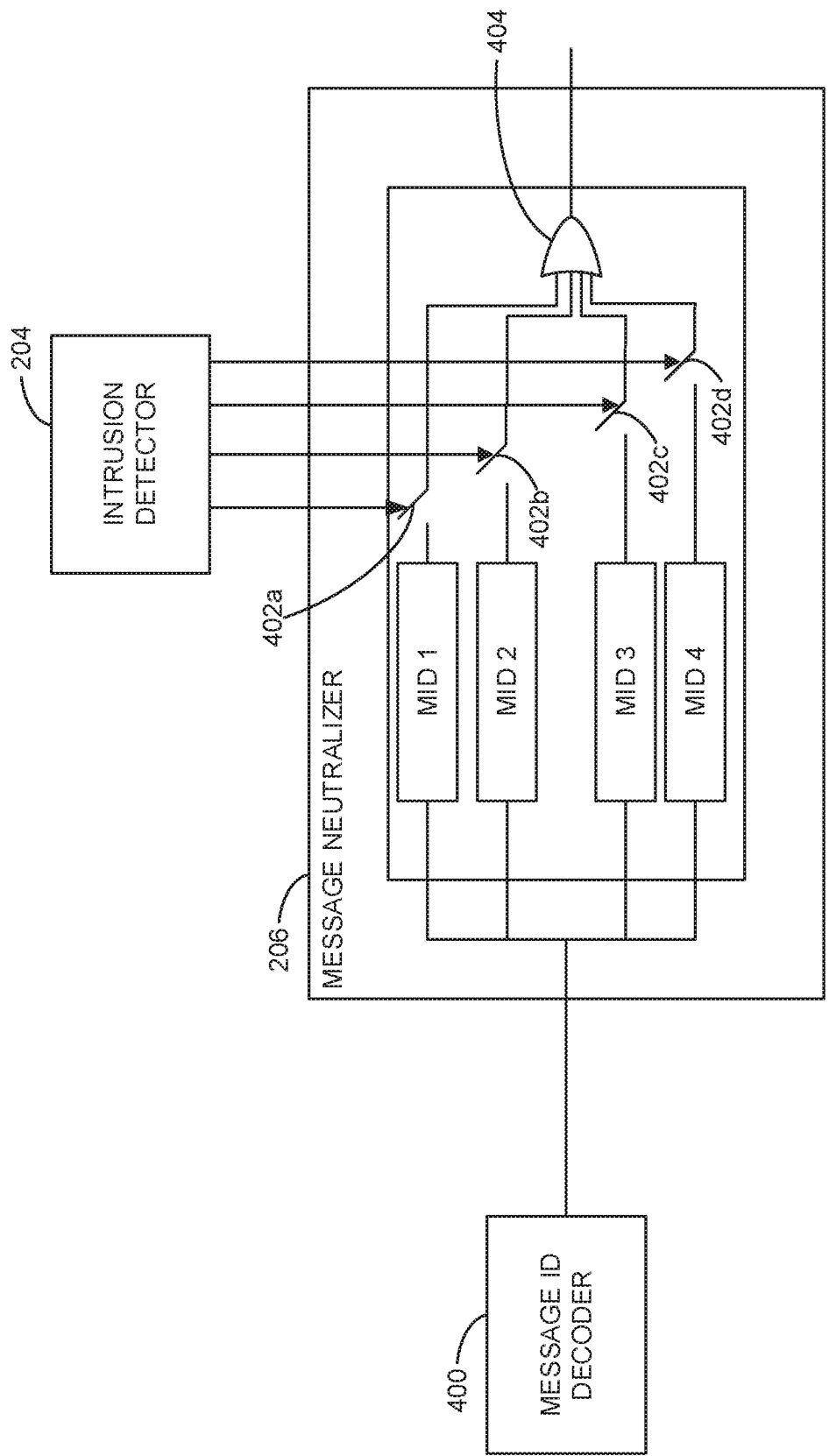
FIG. 4 is a block diagram of the example recovery module of FIGS. 2 and 3.

FIG. 4 illustrates the example message neutralizer 206 and the example intrusion detector 204 of FIGS. 2 and 3. In the illustrated example of FIG. 4, a message ID decoder 400 decodes the actuation commands 110 (FIGS. 1 and 2) from the first controller 102 (FIGS. 1-3). For example, the message ID decoder 400 receives the actuation commands 110 and determines an MID to which the actuation command 110 (e.g., message) should be transmitted. In the illustrated example, MID 1, 2, 3, and 4 correspond to different parts of the vehicle and/or sensors. For example MID 1 may correspond to a wheel of a vehicle, an actuator 104 that controls the wheel, MID 2 may correspond to an engine, or an engine sensor, etc. In some examples, the intrusion detector 204 may receive sensor measurements 114 indicating increased wheel speed, and the intrusion detector 204 may identify that MID 1 has been compromised and/or has transmitted a malicious message. As such, the intrusion detector 204 may actuate the message neutralizer 206 upon consuming a single malicious message transmitted by the first controller 102.

In the illustrated example of FIG. 4, the message neutralizer 206 includes a set of switches 402a-d coupled to an output comparator 404 of the MID 1-4 (e.g., message identifier verifiers). In the illustrated example, the message neutralizer 206 neutralizes selected messages transmitted by the first controller 102 when the first controller 102 is compromised (e.g., the intrusion detector 204 identifies a malicious message). In some examples, the message neutralizer 206 neutralizes the selected messages by closing the switches 402a-d. For example, the intrusion detector 204 may identify that MID 1 is transmitting malicious messages. As such, the message neutralizer 206 may close switch 402a to neutralize the messages transmitted through MID 1. In some examples, when a single MID is compromised and/or transmitting malicious messages, the message neutralizer 206 causes the first controller 102 to become isolated from the communication bus 107 in a first phase, illustrated in FIG. 10. In some examples, when multiple MIDs are compromised and/or transmitting malicious messages, the message neutralizer 206 causes the first controller 102 to become isolated from the communication bus 107 in a second phase, illustrated in FIG. 11.

Figure 10:
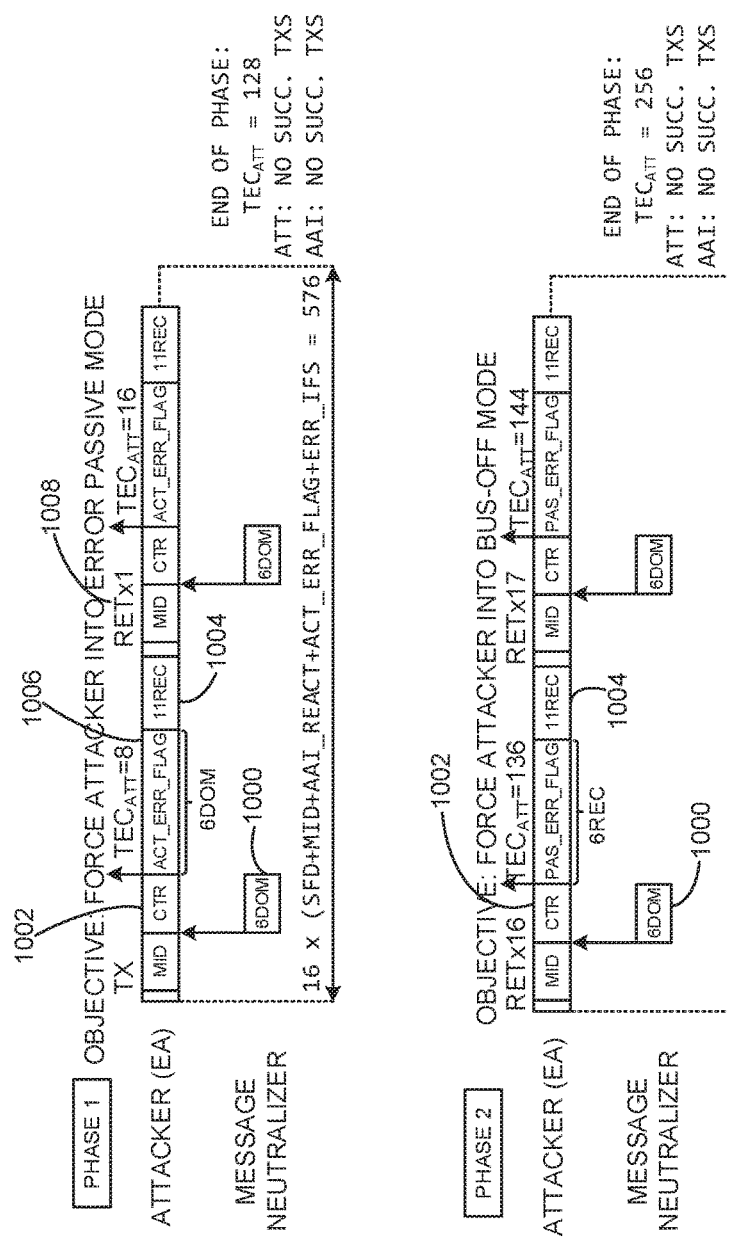
FIG. 10 is example activity during a recovery mode of a single transmitted attacker message.

Turing to FIG. 10, during the first phase, the message neutralizer 206 repeatedly transmits M dominant bits 1000 associated with a message control field 1002 followed by an extended inter-frame spacing of eleven recessive bits 1004, for a total of N transmissions. In some examples, values M and N are determined based on protocols of the communication bus 107 and may correspond to bit lengths of a message field illustrated in FIG. 9. For ease of description, examples disclosed herein are described using six (M) dominate bits, and sixteen (N) transmissions. However, any number of bits and/or transmissions may be utilized.

Figure 11:
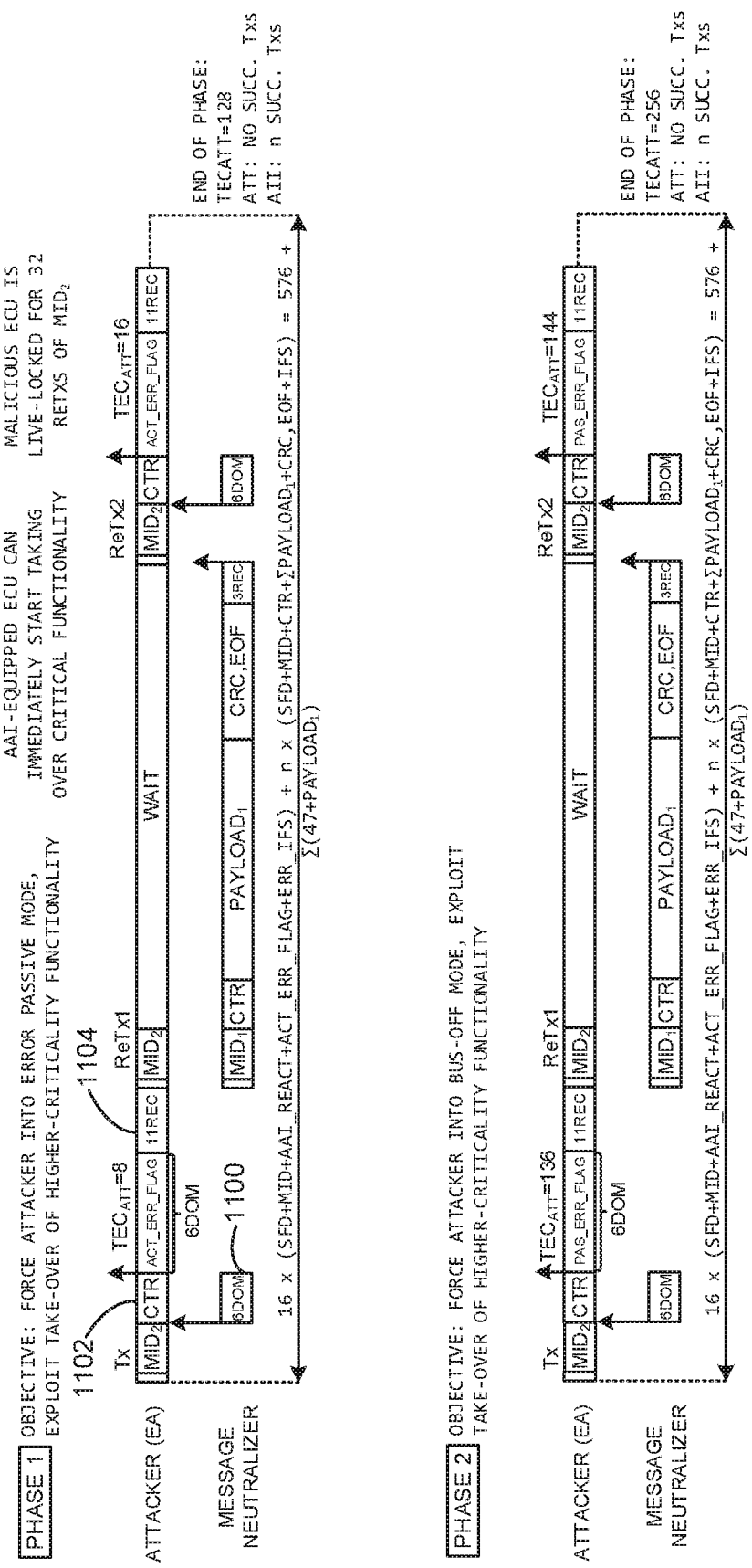
FIG. 11 is example activity during a recovery mode of multiple transmitted attacker messages.

Turning to FIG. 11, during the second phase, the message neutralizer 206 repeatedly transmits six dominant bits 1100 associated with the message control field 1102 followed by an extended inter-frame spacing of eleven recessive bits 1104, for a total of sixteen transmissions. In some examples, the message neutralizer 206 may repeatedly transmit M recessive bits prior to the extended inter-frame spacing.

Turning back to the illustrated example of FIG. 4, the message neutralizer 206 causes the first controller 102 to become isolated from the communication bus 107 within a period of time equal to a duration of transmission of 1152 bits on the communication bus 107, which corresponds to a worst case bus-off delay of 1152 bits which corresponds to 1.152 ms at bus speed of 1 Mbps. A bus-off delay of 1152 bits is significantly shorter than typical message periods (minimum period of periodically transmitted messages is on the order of 10 ms). This indicates that the isolation latency of the message neutralizer 206 does not endanger network responsiveness. For example, this amount of bus-off delay is tolerable in prior systems as such delay can be a result of a hard fault and even regular bus arbitration. The message neutralizer 206 forces the first controller 102 into a bus-off mode so the second controller 202 can safely and efficiently operate the vehicle.

Due to the networked nature of the network configuration of FIG. 3, a network-based implementation of the recovery module 200 may not ensure that identical sensor measurements 114 are consumed for monitoring purposes, as the sensor measurements 114 are consumed by the original controller (e.g., the first controller 102). As such, example synchronous and asynchronous execution modes of the recovery module 200. In both modes, there is architectural independence of the first controller 102.

In the synchronous mode of FIG. 5, the network-based intrusion detector 204 and the second controller 202 buffer sensor measurements 114 transmitted over the network 302, but perform state estimation, intrusion detection and control law computation after the intrusion detector 204 and the second controller 202 obtain the actuation command 110 of the first controller 102. At that time, the most recent sensor measurements 114 in the buffer are used, and earlier sensor measurements 114 are discarded. This scheme provides suitable synchronization of the second controller 202 to the first controller 102 as the sensor measurements 114 closest to the first controller's 102 actuation command 110 are used. In some examples, this scheme provides near-perfect synchronization. FIG. 5 illustrates an example sequence of invocations of the second controller 202 synchronous to actuation messages of the first controller 102 in the case of two sensors.

In the asynchronous mode of FIG. 6, invocations of the network-based intrusion detector 204 and the second controller 202 are asynchronous to the invocations of the first controller 102. A similar execution model is often employed in OEM original controllers (i.e., sensing transmissions and invocations of the first controller 102 are not synchronized), due to the lack of intrinsic time synchronization over broadcast networks such as a Controller Area Network (CAN). In this case, the worst-case deviation between the internal states of the two controllers corresponds to the worst-case evolution of the system's states during one sampling period. This is true as the synchronization error in invocations of two controllers due to the frequency skews cannot exceed one sampling period (when the controllers' periodicity is the same). FIG. 6 illustrates an example sequence of fully asynchronous invocations of the recovery controller.

In both modes of operation, inherent to the system's dynamics is the physical inertia limiting changes in the system's states between controller activations. In some examples, the continuous-time dynamical system does not exhibit significant state changes throughout one control period (otherwise, the first controller 102 would be invalid). Thus, close convergence of the internal states of two controllers is guaranteed under these constraints. In the illustrated examples of FIGS. 5 and 6, one malicious actuation command sent by the first controller 102 reaches the actuator 104, as the command must be consumed by the intrusion detector 204 before an intrusion is flagged. However, the inertia of the underlying physical system accommodates this disturbance and especially in the case of practical systems where actuator ECUs internally limit maximal change of actuation signal over every actuation period. Additionally, the rate of false positives, and thus, unnecessary recoveries, can be analytically controlled for specific instances of the closed-loop intrusion detector 204 (e.g., based on mean wheel residual signal squared ($x^2$)) by threshold assignment, given that the probability distribution of the residual signals will be known for known noise models (e.g., Gaussian).

Figure 7:
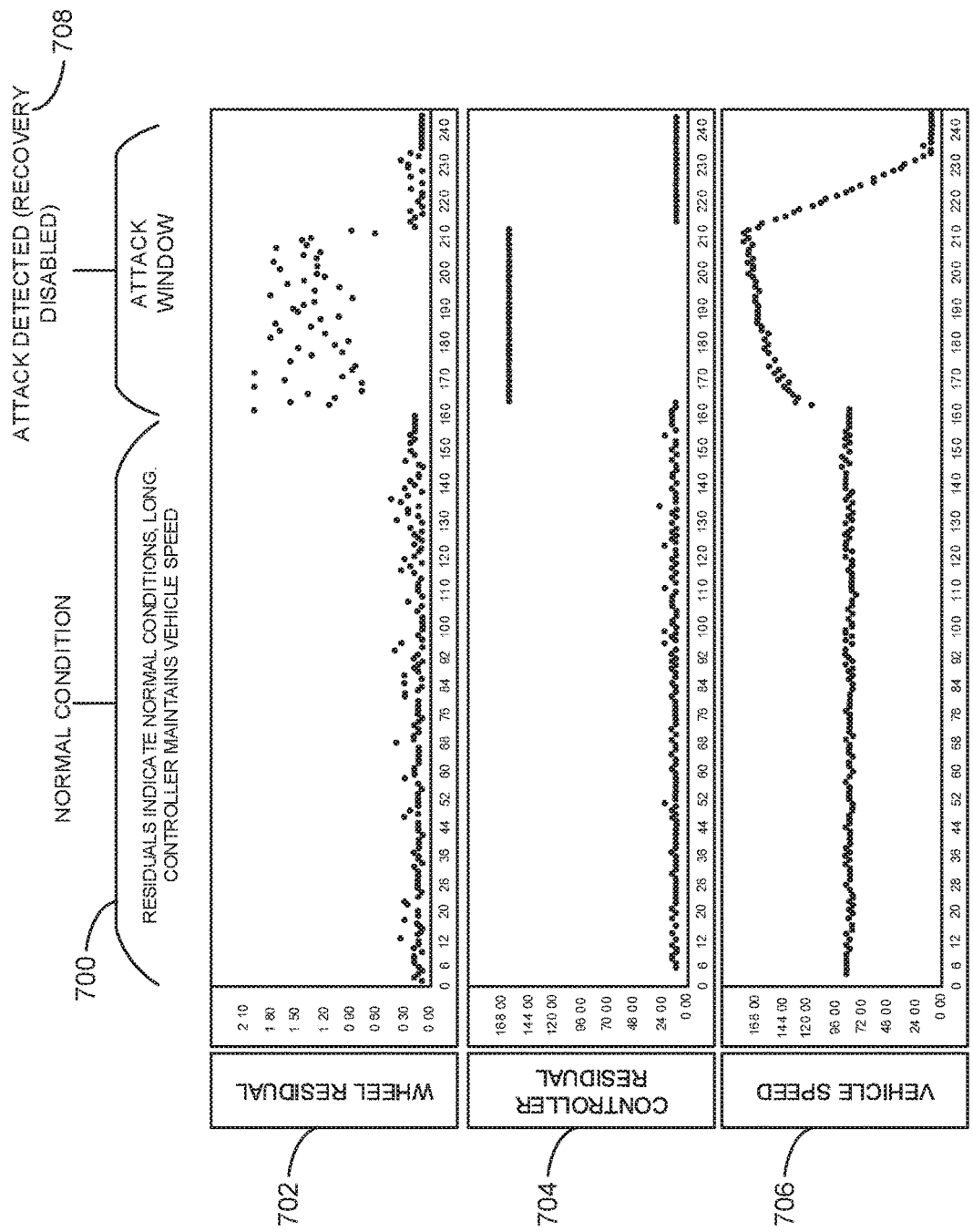
FIG. 7 is an example graph illustrating an attack with recovery mode disabled.

FIG. 7 illustrates the severe effects of the message modification performed by an internal attacker in the first controller 102. Section 700 of FIG. 7 (marked Normal condition) shows the mean wheel residual signal squared 702, and the controller residual squared 704 under normal conditions while vehicle speed 706 is maintained at a set-point by the first controller 102. During the attack window 708, an internal attack on the first controller 102 introduces a bias on the actuation command 110 (FIG. 1) before the command is sent to the actuator 104. This results in a sudden increase in the vehicle speed. This example demonstrates the effects on the system when the recovery module 200 (FIGS. 2 and 3) is disabled.

Figure 8:
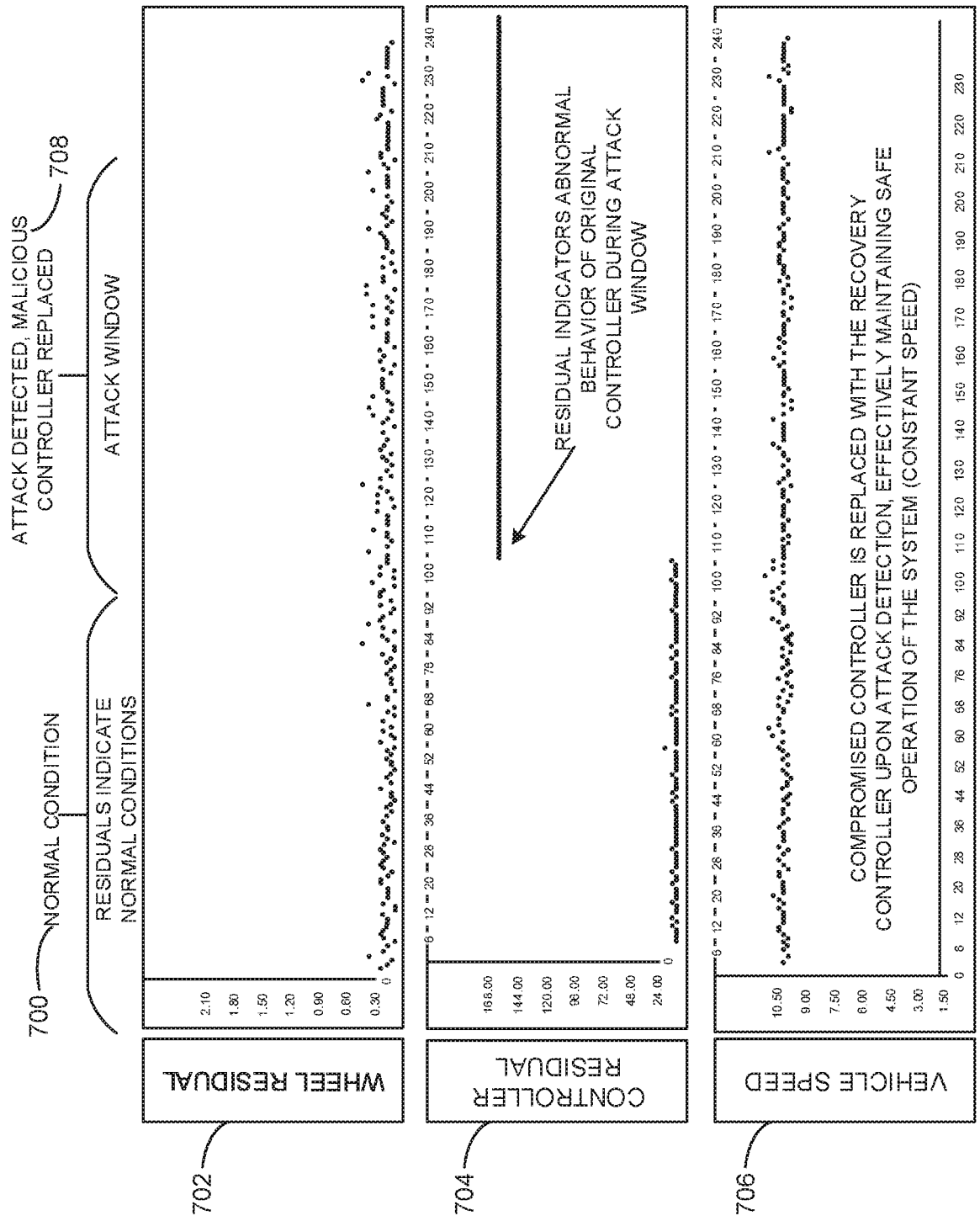
FIG. 8 is an example graph illustrating an attack with recovery mode enabled.

FIG. 8 illustrates the same scenario described above in connection with FIG. 7, but with the recovery module 200 enabled. Upon attack detection, the first controller 102 is disconnected (e.g., isolated from the communication bus 107) and the second controller 202 is engaged to the communication bus 107, effectively maintaining the control functionality. As shown at the bottom of FIG. 8 (e.g., at reference number 706), the vehicle speed remains constant. In this case, the attacker's malicious action is fully contained by the swapping of the controllers 102, 202, and no effect takes place in the vehicle.

FIG. 9 is an illustration of an example message structure 900 including message fields 902 and their respective bit lengths 904. The example message fields 902 may be utilized by the message neutralizer 206 (FIG. 2) to neutralize messages in a manner consistent with FIGS. 10 and 11. For example, the message neutralizer 206 may use a message field with a bit length of 6. As such, the message neutralizer 206 may select any message field from section 906.

FIGS. 10 and 11 illustrate the first phase and second phase described above in connection with FIG. 4. In the illustrated example of FIG. 10 the compromised first controller 102 transmits a single message ID. In the example of FIG. 11 the compromised first controller 102 transmits multiple message IDs. In the illustrated example of FIG. 10, the message neutralizer 206 operates assuming that all existing ECUs adhere to the standard CAN bus protocol, which governs that a module will try to retransmit the same frame if a previous transmission has failed. That is, even though a message of higher priority is queued in the application layer, the ECU will insist with the same message which is currently being processed by the physical CAN layer—until the message is finally transmitted, or the ECU accumulates enough transmission errors to enter a bus-off state. The bus-off process is conducted in two phases, each of which contains up to 16 (re-)transmissions. Once the presence of the malicious ECU on the communication bus is identified by observing the target MID, it is sufficient for the message neutralizer 206 to transmit six dominant bits 1000 during the transmission of the message control field (CTR) 1002. This action is guaranteed to trigger a bit-stuffing error on the malicious transmitter CAN bus controller, causing the transmission error count (TEC) to increase by 8. Given that the malicious ECU is in error active (EA) mode, an active error flag (ACT_ERR_FLAG) 1006 is transmitted by the malicious ECU in the form of 6 dominant bits, followed by an extended inter-frame spacing (IFS) of 11 recessive bits 1004. After this, a retransmission 1008 is attempted by the malicious ECU, when the described process repeats for a total of 16 (re)transmissions. After the TEC exceeds 127 in the malicious controller ECU, that ECU enters error passive (EP) mode, which ends Phase 1 in FIG. 10. The entire phase repeats again for another 16 retransmissions (as Phase 2) with the exception that the malicious controller transmits a passive error flag (PAS_ERR_FLAG) that includes 6 recessive (rather than dominant) bits upon failed transmissions due to the actions of the message neutralizer 206. At the end of Phase 2, the TEC in the malicious controller exceeds 255, which causes the malicious controller ECU to enter bus-off state. In such example, the communication bus 107 is busy for the duration of 1152 bits (1.152 ms at bus speed of 1 Mbps), while the message neutralizer 206 works towards the isolation of the malicious ECU (e.g., the first controller 102). Prompt recovery is desirable to ensure smoother transition from the original (compromised) controller to the replacement one (e.g., the second controller 202).

FIG. 11 illustrates an example of the second controller 202 taking over control of the vehicle prior to the first controller 102 entering bus-off state. FIG. 11 illustrates the attacked ECU's (e.g., first controller 102) activity along with the reactions of the message neutralizer 206 in the case when multiple MIDs are transmitted by the attacked ECU. Upon intrusion detection, the message neutralizer 206 commences neutralization of messages transmitted by the malicious ECU, like in the previous case. However, if that message is not of highest priority among messages transmitted by the malicious ECU, the message neutralizer 206 can commence taking over attacked functionality of higher-criticality immediately after neutralizing the initial malicious transmission. This is the case since immediately following identification of the malicious ECU, the malicious ECU may not necessarily transmit its highest priority message. In such case, the message neutralizer 206 can commence adversary isolation on a lower-priority (and thus lower-criticality) message, while immediately replacing higher-criticality functionality of the malicious ECU by transmitting higher-priority messages originally transmitted by that ECU. This is guaranteed as messages with higher priority win communication bus arbitration. According to the standard CAN controller implementations, the malicious ECU will be live-locked for 32 retransmissions before it is isolated from the communication bus 107 by the message neutralizer 206, while the message neutralizer 206 can commence taking over higher-criticality functions. The process repeats in two phases, as previously described, with the duration of 1152+ $\Sigma_{i=1}^{N}[47+\text{len}(\text{PAYLOAD}_i)]$bits, where N is the number of higher-priority messages transmitted by the message neutralizer 206 while the malicious ECU is being isolated, and 47 bits correspond to the total CAN packet overhead standardized by the CAN protocol. In the general case, when the attacked ECU is counteracted by the message neutralizer 206 on the message of priority $P_i$, the message neutralizer 206 can commence taking over functionality dependent on messages with priorities $\geq P_i+1$ transmitted by the target ECU. This is possible immediately upon first neutralization of the initial malicious transmission as shown in FIG. 11. This implies that the worst case blocking time messages with priority $\leq P_i+1$ can experience due to bus-off isolation of a malicious ECU through message of priority $P_i$ for messages with priority $\leq P_i+1$ corresponds to 1152 bits or 1.152 ms at bus speed of 1 Mbps. As described above, blocking time may be prolonged if the message neutralizer 206 decides to transmit higher-criticality messages while conducting the bus-off of the malicious ECU. As such, there exist scenarios where the message neutralizer 206 should not commence adversary isolation immediately, but once a lower-criticality message is transmitted by the malicious ECU, since in that case, the message neutralizer 206 can start taking over higher-criticality attacked functionality before waiting for the malicious ECU to reach bus-off state. On the other hand, allowing the adversary to transmit high-criticality messages while can be extremely risky, given that the adversary has already been active for the period of the detection delay. Thus, in some examples, the message neutralizer 206 commences adversary isolation at the first malicious transmission that is detected, regardless of the malicious transmissions priority (i.e., criticality).

While an example manner of implementing recovery module 200 of FIGS. 2-3 is illustrated in FIG. 2, one or more of the elements, processes and/or devices illustrated in FIG. 2 may be combined, divided, re-arranged, omitted, eliminated and/or implemented in any other way. Further, the example second controller 202, the example intrusion detector 204, the example message neutralizer 206 and/or, more generally, the example recovery module 200 of FIG. 2 may be implemented by hardware, software, firmware and/or any combination of hardware, software and/or firmware. Thus, for example, any of the example second controller 202, the example intrusion detector 204, the example message neutralizer 206 and/or, more generally, the example recovery module 200 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example second controller 202, the example intrusion detector 204, the example message neutralizer 206 and/or, more generally, the example recovery module 200 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example recovery module 200 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 12:
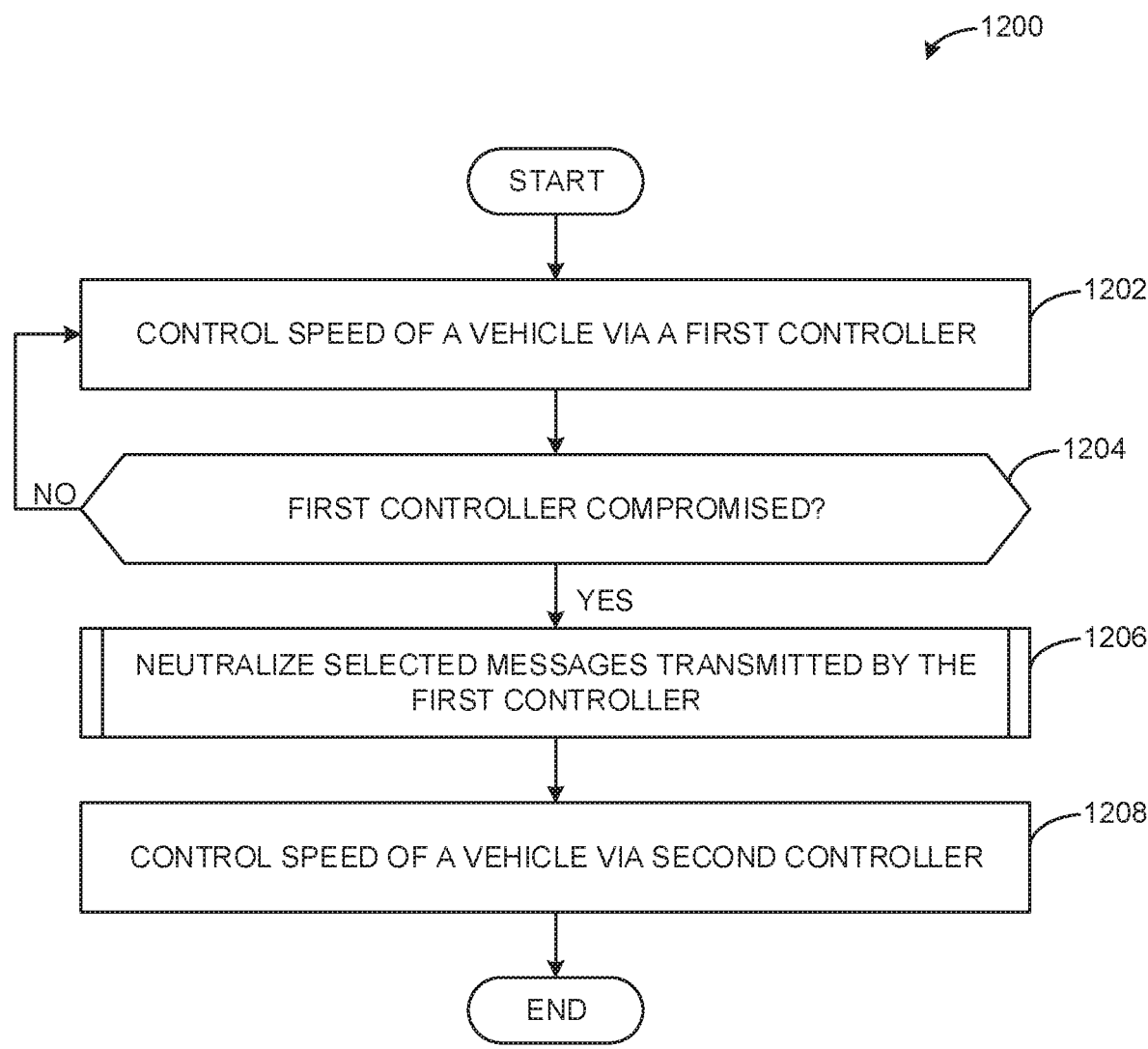
FIGS. 12-13 are flowcharts representative of machine readable instructions which may be executed to implement the recovery module of FIGS. 1-3 to recover operation of the vehicle during a malicious attack.
Figure 13:
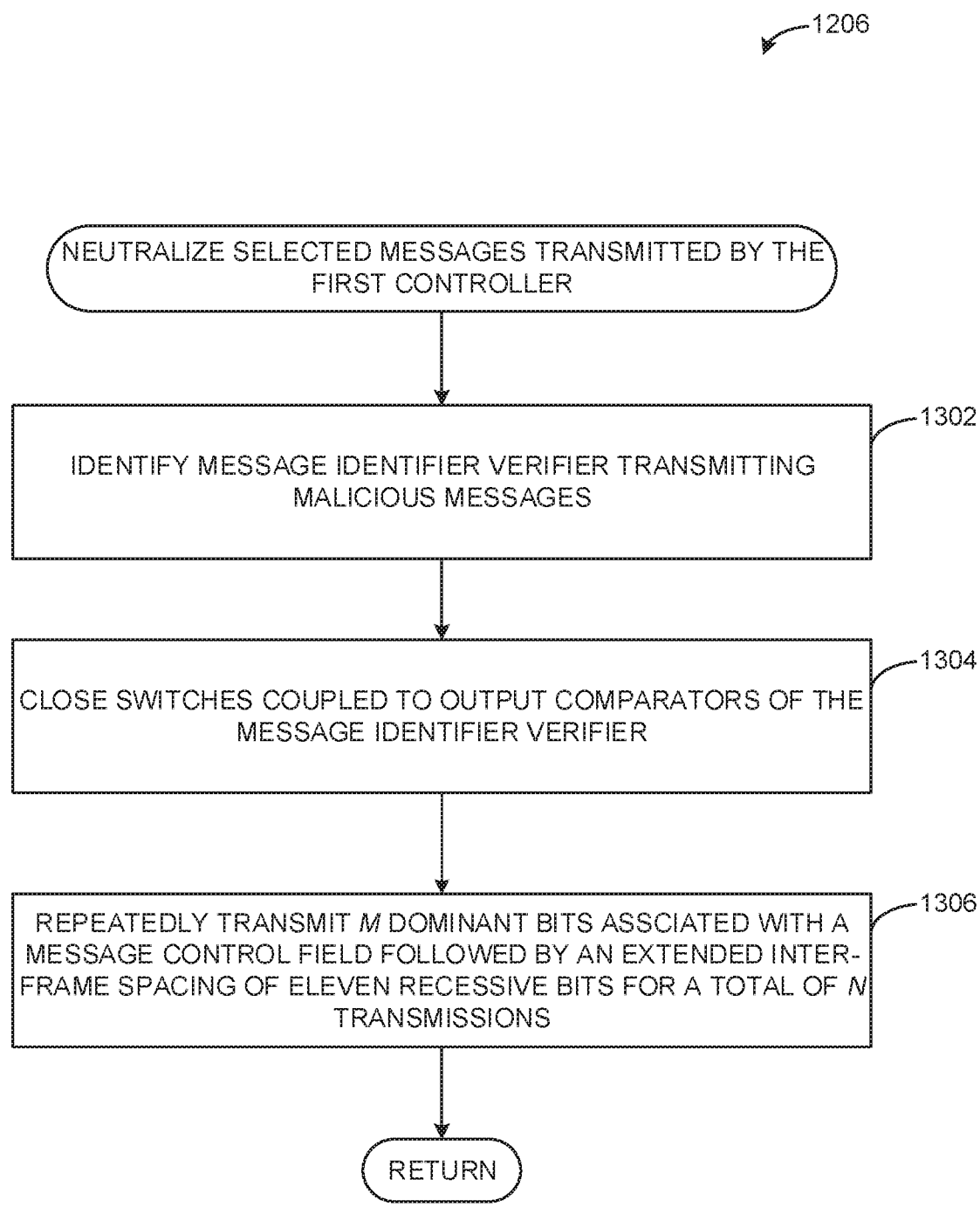

Flowcharts representative of example hardware logic, machine readable instructions, hardware implemented state machines, and/or any combination thereof for implementing the recovery module 200 of FIG. 2 are shown in FIGS. 12-13. The machine readable instructions may be an executable program or portion of an executable program for execution by a computer processor such as the processor 1412 shown in the example processor platform 1400 discussed below in connection with FIG. 14. The program may be embodied in software stored on a non-transitory computer readable storage medium such as a CD-ROM, a floppy disk, a hard drive, a DVD, a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowcharts illustrated in FIGS. 12-13, many other methods of implementing the example recovery module 200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 12-13 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all for ms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Example machine readable instructions that may be executed to implement the recovery module 200 of FIGS. 2-3 are illustrated in FIG. 12. With reference by example to FIG. 2, the example machine readable instructions (e.g., process 1200) of FIG. 12 begin by controlling a reference signal of a vehicle via a first controller (block 1202). For example, the first controller 102 controls the speed of the vehicle. The intrusion detector 204 determines if the first controller has been compromised (block 1204). For example, the intrusion detector 204 determines if the first controller 102 is transmitting malicious messages in a manner consistent with the description of FIGS. 2-4. If the intrusion detector 204 determines that the first controller 102 is not compromised, control returns to block 1202. If the intrusion detector 204 determines that the first controller 102 has been compromised, the message neutralizer 206 neutralizes selected messages transmitted by the first controller (block 1206). For example, the message neutralizer 206 neutralizes messages from the first controller 102. The second controller 202 controls the reference signal of the vehicle (block 1208). For example, the first controller 102 becomes isolated from the communication bus 107, and the second controller 202 is engaged to, connected to, or otherwise enabled to communicate via the communication bus 107 to control the vehicle. The process 1200 ends.

FIG. 13 illustrates an example of performing the processes of block 1206 of FIG. 12 to neutralize selected messages from the first controller 102. In the illustrated example of FIG. 13, the message neutralizer 206 identifies a message identifier verifier transmitting malicious messages (block 1302). For example, the message neutralizer 206 may identify MID 1 (FIG. 4) as transmitting malicious messages. The message neutralizer 206 closes switches coupled to output comparators of the message identifier verifier (block 1304). For example, the message neutralizer 206 may close switch 402a to begin neutralizing the malicious messages, as shown in FIG. 4. The message neutralizer 206 repeatedly transmits M dominant bits associated with a message control field followed by an extended inter-frame spacing of eleven recessive bits for a total of N transmissions (block 1306). For example, the message neutralizer 206 transmits six dominant bits associated with a message control filed followed by an extended inter-frame spacing of eleven recessive bits for a total of sixteen transmissions, as shown in FIG. 10. The process returns to FIG. 12.

Figure 14:
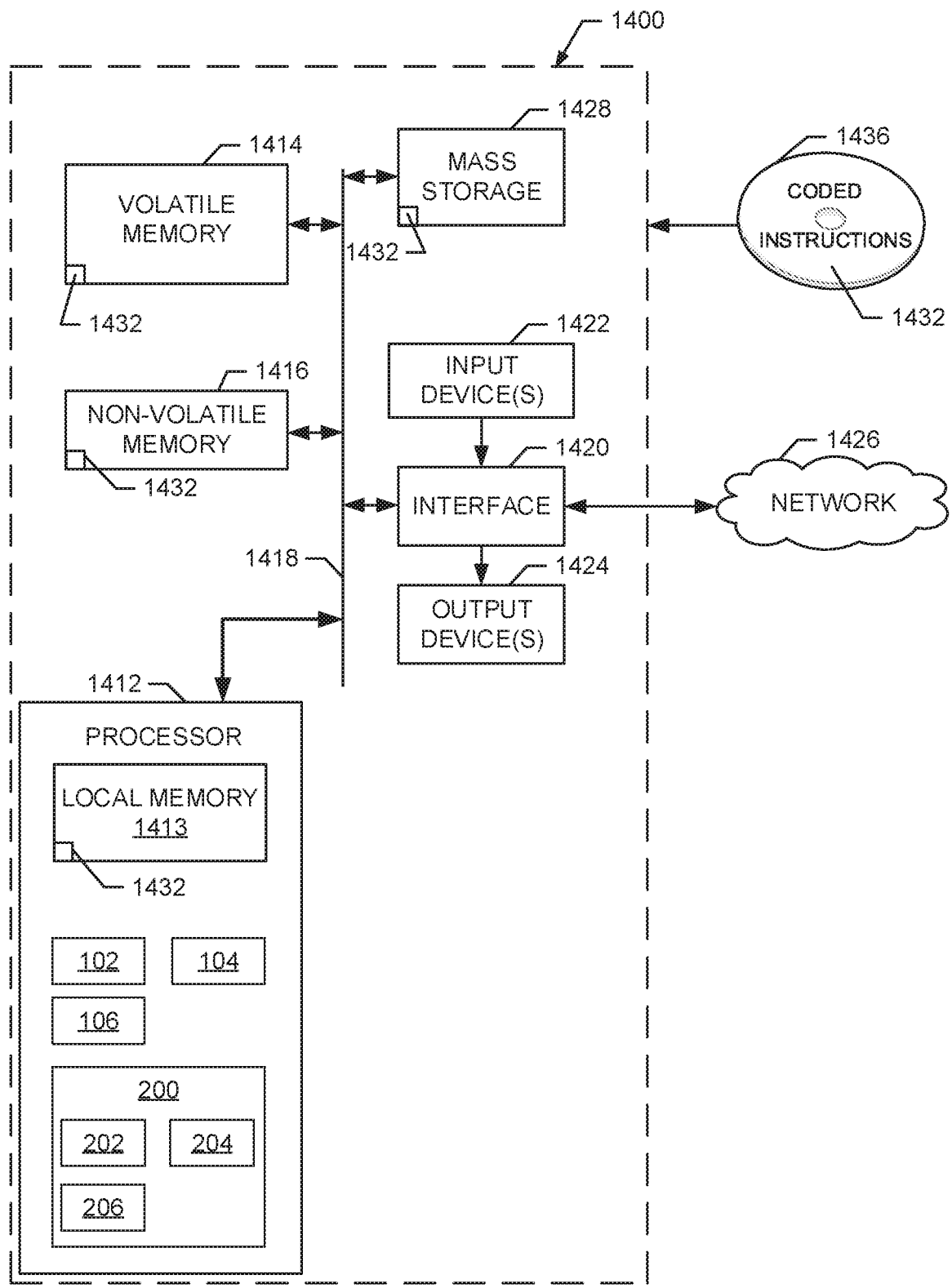
FIG. 14 is a block diagram of an example processing platform structured to execute the instructions of FIGS. 12-13 to implement the recovery module of FIGS. 1-3 to recover operation of the vehicle during a malicious attack.

FIG. 14 is a block diagram of an example processor platform 1400 structured to execute the instructions of FIGS. 12-13 to implement the recovery module 200 of FIGS. 2-3. The processor platform 1400 can be, for example, a server, a personal computer, a self-learning machine (e.g., a neural network), or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the first controller 102, the second controller 202, the intrusion detector 204, and the message neutralizer 206.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), a Bluetooth® interface, a near field communication (NFC) interface, and/or a PCI express interface.

In the illustrated example, one or more input devices 1422 are connected to the interface circuit 1420. The input device(s) 1422 permit(s) a user to enter data and/or commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1420 of the illustrated example, thus, typically includes a graphics driver card, a graphics driver chip and/or a graphics driver processor.

The interface circuit 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, redundant array of independent disks (RAID) systems, and digital versatile disk (DVD) drives.

The machine executable instructions 1432 of FIGS. 12-13 may be stored in the mass storage device 1428, in the volatile memory 1414, in the non-volatile memory 1416, and/or on a removable non-transitory computer readable storage medium such as a CD or DVD.

From the foregoing, it will be appreciated that example methods, apparatus and articles of manufacture have been disclosed that detect anomalies in autonomous vehicles and recover safe and efficient operation of the vehicle from malicious attacks. The disclosed methods, apparatus and articles of manufacture improve the efficiency of using a computing device by isolating malicious attacks and operating an autonomous vehicle via a recovery controller. The disclosed methods, apparatus and articles of manufacture are accordingly directed to one or more improvement(s) in the functioning of a computer operating an autonomous vehicle.

While examples disclosed herein are directed to a controller of an autonomous vehicle, the disclosed examples may be implemented in, for example, controllers that are not in an autonomous vehicle. For example, the disclosed examples may be implemented in an artificial intelligence (AI)-powered motorized security camera. In such an example, a malicious attacker may attempt to take control of the camera and direct the camera away from an area where the malicious attacker is attempting to commit illegal activities. As such, the recovery module disclosed herein would neutralize the malicious attacker's messages and recover control of the AI-powered motorized security camera. In another example, a malicious attacker may attempt to control an automated pitching machine for batting practice and direct the pitches outside of the strike zone to hit an individual in a batter's box. In such an example, the recovery module would mitigate any malicious attacks from taking over the pitching machine, ensuring a safe environment for individuals to practice.

The following pertain to further examples disclosed herein.

Example 1 can be a first controller to control a machine (e.g., a camera, a pitching machine, an automatic door, a drone, etc.) via a communication bus, a second controller to control the machine when the first controller is compromised; and a message neutralizer to neutralize messages transmitted by the first controller when the first controller is compromised, the neutralized messages to cause the first controller to become isolated from the communication bus.

Example 2 includes the apparatus of example 1, further including an intrusion detector, the intrusion detector to actuate the message neutralizer based on detecting a single malicious message transmitted by the first controller.

Example 3 includes the apparatus of any one of examples 1-2, wherein the second controller is to control the machine before the first controller is isolated from the communication bus.

Example 4 includes the apparatus of any one of examples 1-3, wherein the message neutralizer includes switches in circuit with output comparators of a message identifier verifier.

Example 5 includes the apparatus of any one of examples 1-4, wherein the message neutralizer neutralizes the messages by closing the switches.

Example 6 includes the apparatus of any one of examples 1-5, wherein the message neutralizer causes the first controller to become isolated from the communication bus within a period of time during which 1152 bits can be transmitted on the communication bus.

Example 7 includes the apparatus of any one of examples 1-6, wherein the message neutralizer causes the first controller to become isolated from the communication bus in a first phase and a second phase.

Example 8 includes the apparatus of any one of examples 1-7, wherein during the first phase, the message neutralizer is to repeatedly transmit, for a total of sixteen transmissions, six dominant bits associated with a message control field followed by an extended inter-frame spacing of eleven recessive bits.

Example 9 includes the apparatus of any one of examples 1-8, wherein, during the second phase, the message neutralizer is to repeatedly transmit, for a total of sixteen transmissions, six recessive bits associated with the message control field followed by an extended inter-frame spacing of eleven recessive bits.

Example 10 includes the apparatus of any one of examples 1-9, wherein the second controller is to synchronize with the first controller prior to taking over control of the machine.

Example 11 is an apparatus to isolate a first controller in an autonomous vehicle. The apparatus of example 11 includes a first controller to control a reference signal of the autonomous vehicle via a communication bus; a second controller to control the reference signal of the autonomous vehicle when the first controller is compromised; and a message neutralizer to neutralize messages transmitted by the first controller when the first controller is compromised, the neutralized messages to cause the first controller to become isolated from the communication bus.

Example 12 includes the apparatus of example 11, further including an intrusion detector, the intrusion detector to actuate the message neutralizer based on detecting a single malicious message transmitted by the first controller.

Example 13 includes the apparatus of any one of examples 11-12, wherein the second controller is to control the autonomous vehicle before the first controller is isolated from the communication bus.

Example 14 includes the apparatus of any one of examples 11-13, wherein the message neutralizer includes switches in circuit with output comparators of a message identifier verifier.

Example 15 includes the apparatus of any one of examples 11-14, further including a recovery module to neutralize the messages and initiate replacing the first controller with the second controller by operating the switches.

Example 16 includes the apparatus of any one of examples 11-15, further including a recovery module to cause the first controller to become isolated from the communication bus within a period of time during which 1152 bits can be transmitted on the communication bus.

Example 17 includes the apparatus of any one of examples 11-16, wherein the message neutralizer is to neutralize the messages by corrupting the messages, the corrupted messages to cause the first controller to become isolated from the communication bus in a first phase and a second phase.

Example 18 includes the apparatus of any one of examples 11-17, wherein during the first phase, the message neutralizer is to repeatedly transmit, for a total of sixteen transmissions, six dominant bits associated with a message control field followed by an extended inter-frame spacing of eleven recessive bits.

Example 19 includes the apparatus of any one of examples 11-18, wherein, during the second phase, the message neutralizer is to repeatedly transmit, for a total of sixteen transmissions, six recessive bits associated with the message control field followed by an extended inter-frame spacing of eleven recessive bits.

Example 20 includes the apparatus of any one of examples 11-19, wherein the second controller is to synchronize with the first controller prior to taking over control of the vehicle.

Example 21 is non-transitory computer readable medium comprising instructions that, when executed, cause a machine to at least: control a reference signal of an autonomous vehicle via a first controller via a communication bus; control the reference signal of the autonomous vehicle via a second controller when the first controller is compromised; and neutralize messages transmitted by the first controller when the first controller is compromised, the neutralized messages to cause the first controller to become isolated from the communication bus.

Example 22 includes the subject matter of example 21, wherein the instructions further cause the machine to neutralize messages based on detecting a single malicious message transmitted by the first controller.

Example 23 includes the subject matter of any one of examples 21-22, wherein the second controller is to control the autonomous vehicle before the first controller is isolated from the communication bus.

Example 24 includes the subject matter of any one of examples 21-23, wherein the instructions further cause the machine to neutralize the messages by closing switches.

Example 25 includes the subject matter of any one of examples 21-24, wherein the instructions further cause the machine to cause the first controller to become isolated from the communication bus within a period of time during which 1152 bits can be transmitted on the communication bus.

Example 26 includes the subject matter of any one of examples 21-25, wherein the instructions further cause the first controller to become isolated from the communication bus in a first phase and a second phase.

Example 27 includes the subject matter of any one of examples 21-26, wherein during the first phase, the instructions further cause the machine to repeatedly transmit, for a total of sixteen transmissions, six dominant bits associated with a message control field followed by an extended inter-frame spacing of eleven recessive bits.

Example 28 includes the subject matter of any one of examples 21-27, wherein, during the second phase, the instructions further cause the machine to repeatedly transmit, for a total of sixteen transmissions, six recessive bits associated with the message control field followed by an extended inter-frame spacing of eleven recessive bits.

Example 29 includes the subject matter of any one of examples 21-28, wherein the instructions further cause the machine to synchronize the second controller with the first controller prior to taking over control of the vehicle.

Example 30 is a method to isolate a first controller in an autonomous vehicle, the method includes: controlling, by executing an instruction with a processor, a reference signal of an autonomous vehicle via a first controller via a communication bus; controlling, by executing an instruction with the processor, the reference signal of the autonomous vehicle via a second controller when the first controller is compromised; and neutralizing, by executing an instruction with the processor, messages transmitted by the first controller when the first controller is compromised, the neutralized messages to cause the first controller to become isolated from the communication bus.

Example 31 includes the subject matter of example 30, wherein neutralizing the messages is based on detecting a single malicious message transmitted by the first controller.

Example 32 includes the subject matter of any one of examples 30-31, wherein the second controller is to control the autonomous vehicle before the first controller is isolated from the communication bus.

Example 33 includes the subject matter of any one of examples 30-32, wherein the neutralizing of the messages includes closing switches.

Example 34 includes the subject matter of any one of examples 30-33, further including isolating the first controller from the communication bus within a period of time during which 1152 bits can be transmitted on the communication bus.

Example 35 includes the subject matter of any one of examples 30-34, further including isolating the first controller from the communication bus in a first phase and a second phase.

Example 36 includes the subject matter of any one of examples 30-35, wherein during the first phase, repeatedly transmitting, for a total of sixteen transmissions, six dominant bits associated with a message control field followed by an extended inter-frame spacing of eleven recessive bits.

Example 37 includes the subject matter of any one of examples 30-36, wherein, during the second phase, repeatedly transmitting, for a total of sixteen transmissions, six recessive bits associated with the message control field followed by an extended inter-frame spacing of eleven recessive bits.

Example 38 includes the subject matter of any one of examples 30-37, further including synchronizing the second controller with the first controller prior to taking over control of the vehicle.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to isolate a first controller in an autonomous vehicle, the apparatus comprising:
   a first controller to control a reference signal of the autonomous vehicle via a communication channel;
   a second controller to control the reference signal of the autonomous vehicle when the first controller is compromised; and
   a message neutralizer to neutralize messages transmitted by the first controller when the first controller is compromised by corrupting the messages, the corrupted messages to cause the first controller to become isolated from the communication channel.

2. The apparatus of claim 1, further including an intrusion detector, the intrusion detector to actuate the message neutralizer based on detection of a single malicious message transmitted by the first controller.

3. The apparatus of claim 1, wherein the second controller is to control the autonomous vehicle before the first controller is isolated from the communication channel.

4. The apparatus of claim 1, wherein the message neutralizer includes switches in circuit with output comparators of a message identifier verifier.

5. The apparatus of claim 4, further including a recovery module to neutralize the messages and initiate replacement of the first controller with the second controller by operating the switches.

6. An apparatus to isolate a first controller in an autonomous vehicle, the apparatus comprising:
   a first controller to control a reference signal of the autonomous vehicle via a communication channel;
   a second controller to control the reference signal of the autonomous vehicle when the first controller is compromised; and
   a message neutralizer to neutralize messages transmitted by the first controller when the first controller is compromised, the neutralized messages to cause the first controller to become isolated from the communication channel within a period of time during which 1152 bits can be transmitted on the communication channel.

7. The apparatus of claim 1, wherein the corrupted messages are to cause the first controller to become isolated from the communication channel in a first phase and a second phase.

8. An apparatus to isolate a first controller in an autonomous vehicle, the apparatus comprising:
   a first controller to control a reference signal of the autonomous vehicle via a communication channel;
   a second controller to control the reference signal of the autonomous vehicle when the first controller is compromised; and
   a message neutralizer to:
   neutralize messages transmitted by the first controller by corrupting the messages when the first controller is compromised, the corrupted messages to cause the first controller to become isolated from the communication channel in a first phase and a second phase; and
   during the first phase, repeatedly transmit, for a total of sixteen transmissions, six dominant bits associated with a message control field followed by an extended inter-frame spacing of eleven recessive bits.

9. An apparatus to isolate a first controller in an autonomous vehicle, the apparatus comprising:
   a first controller to control a reference signal of the autonomous vehicle via a communication channel;
   a second controller to control the reference signal of the autonomous vehicle when the first controller is compromised; and
   a message neutralizer to:
   neutralize messages transmitted by the first controller by corrupting the messages when the first controller is compromised, the corrupted messages to cause the first controller to become isolated from the communication channel in a first phase and a second phase; and
   during the second phase, repeatedly transmit, for a total of sixteen transmissions, six recessive bits associated with a message control field followed by an extended inter-frame spacing of eleven recessive bits.

10. The apparatus of claim 1, wherein the second controller is to synchronize with the first controller prior to taking over control of the autonomous vehicle.

11. A non-transitory computer readable medium comprising instructions that, when executed, cause a machine to at least:
    control a reference signal of an autonomous vehicle via a first controller via a communication channel;
    control the reference signal of the autonomous vehicle via a second controller when the first controller is compromised; and neutralize messages transmitted by the first controller when the first controller is compromised by corrupting the messages, the corrupted messages to cause the first controller to become isolated from the communication channel.

12. The non-transitory computer readable medium of claim 11, wherein the instructions further cause the machine to neutralize messages based on detection of a single malicious message transmitted by the first controller.

13. The non-transitory computer readable medium of claim 11, wherein the second controller is to control the autonomous vehicle before the first controller is isolated from the communication channel.

14. The non-transitory computer readable medium of claim 11, wherein the instructions further cause the machine to neutralize the messages by operating switches.

15. A non-transitory computer readable medium comprising instructions that, when executed, cause a machine to at least:
control a reference signal of an autonomous vehicle via a first controller via a communication channel;
control the reference signal of the autonomous vehicle via a second controller when the first controller is compromised; and
neutralize messages transmitted by the first controller when the first controller is compromised, the neutralized messages to cause the first controller to become isolated from the communication channel within a period of time during which 1152 bits can be transmitted on the communication channel.

16. The non-transitory computer readable medium of claim 11, wherein the corrupted messages are to cause the first controller to become isolated from the communication channel in a first phase and a second phase.

17. A non-transitory computer readable medium comprising instructions that, when executed, cause a machine to at least:
control a reference signal of an autonomous vehicle via a first controller via a communication channel;
control the reference signal of the autonomous vehicle via a second controller when the first controller is compromised;
neutralize messages transmitted by the first controller by corrupting the messages when the first controller is compromised, the corrupted messages to cause the first controller to become isolated from the communication channel in a first phase and a second phase; and
during the first phase, repeatedly transmit, for a total of sixteen transmissions, six dominant bits associated with a message control field followed by an extended interframe spacing of eleven recessive bits.

18. A non-transitory computer readable medium comprising instructions that, when executed, cause a machine to at least:
control a reference signal of an autonomous vehicle via a first controller via a communication channel;
control the reference signal of the autonomous vehicle via a second controller when the first controller is compromised;
neutralize messages transmitted by the first controller by corrupting the messages when the first controller is compromised, the corrupted messages to cause the first controller to become isolated from the communication channel in a first phase and a second phase; and
during the second phase, repeatedly transmit, for a total of sixteen transmissions, six recessive bits associated with a message control field followed by an extended interframe spacing of eleven recessive bits.

19. The non-transitory computer readable medium of claim 11, wherein the instructions are to cause the machine to synchronize the second controller with the first controller prior to taking over control of the autonomous vehicle.

20. A method to isolate a first controller in an autonomous vehicle, the method comprising:
controlling, by executing an instruction with a processor, a reference signal of an autonomous vehicle via a first controller via a communication channel;
controlling, by executing an instruction with the processor, the reference signal of the autonomous vehicle via a second controller when the first controller is compromised; and
neutralizing, by executing an instruction with the processor, messages transmitted by the first controller when the first controller is compromised by corrupting the messages, the corrupted messages to cause the first controller to become isolated from the communication channel.

21. The method of claim 20, wherein the neutralizing of the messages is based on detecting a single malicious message transmitted by the first controller.

22. The method of claim 20, wherein the second controller is to control the autonomous vehicle before the first controller is isolated from the communication channel.

23. The method of claim 20, wherein the neutralizing of the messages includes operating switches.

24. A method to isolate a first controller in an autonomous vehicle, the method comprising:
controlling, by executing an instruction with a processor, a reference signal of an autonomous vehicle via a first controller via a communication channel;
controlling, by executing an instruction with the processor, the reference signal of the autonomous vehicle via a second controller when the first controller is compromised; and
neutralizing, by executing an instruction with the processor, messages transmitted by the first controller when the first controller is compromised, the neutralized messages to cause the first controller to become isolated from the communication channel within a period of time during which 1152 bits can be transmitted on the communication channel.

25. The method of claim 20, wherein the corrupted messages are to cause the first controller to become isolated from the communication channel in a first phase and a second phase.

26. A method to isolate a first controller in an autonomous vehicle, the method comprising:
controlling, by executing an instruction with a processor, a reference signal of an autonomous vehicle via a first controller via a communication channel;
controlling, by executing an instruction with the processor, the reference signal of the autonomous vehicle via a second controller when the first controller is compromised;
neutralizing, by executing an instruction with the processor, messages transmitted by the first controller by corrupting the messages when the first controller is compromised, the corrupted messages to cause the first controller to become isolated from the communication channel in a first phase and a second phase; and
during the first phase, repeatedly transmitting, for a total of sixteen transmissions, six dominant bits associated with a message control field followed by an extended inter-frame spacing of eleven recessive bits.

27. A method to isolate a first controller in an autonomous vehicle, the method comprising:
controlling, by executing an instruction with a processor, a reference signal of an autonomous vehicle via a first controller via a communication channel;
controlling, by executing an instruction with the processor, the reference signal of the autonomous vehicle via a second controller when the first controller is compromised;
neutralizing, by executing an instruction with the processor, messages transmitted by the first controller by corrupting the messages when the first controller is compromised, the corrupted messages to cause the first controller to become isolated from the communication channel in a first phase and a second phase; and
during the second phase, repeatedly transmitting, for a total of sixteen transmissions, six recessive bits associated with a message control field followed by an extended inter-frame spacing of eleven recessive bits.

28. The method of claim 20, further including synchronizing the second controller with the first controller prior to taking over control of the autonomous vehicle.

* * * * *